United States Patent
Friedl et al.

(10) Patent No.: US 9,016,493 B2
(45) Date of Patent: Apr. 28, 2015

(54) BAKING APPARATUS WITH MULTIPLE FUNCTIONS AND SIZES

(75) Inventors: Evan Friedl, Fountain Valley, CA (US); Ryan J. Moreau, Fountain Valley, CA (US); Christopher Jon Ostrander, Lawrence, KS (US); Derick R. Schweppe, Lawrence, KS (US)

(73) Assignee: Cooksmith, Inc., Fountain Valley, CA (US)

( * ) Notice: Subject to any disclaimer, the term of this patent is extended or adjusted under 35 U.S.C. 154(b) by 200 days.

(21) Appl. No.: 13/297,396

(22) Filed: Nov. 16, 2011

(65) Prior Publication Data

US 2013/0119068 A1 May 16, 2013

(51) Int. Cl.
| | |
|---|---|
| *B65D 6/18* | (2006.01) |
| *A21B 3/13* | (2006.01) |
| *A47J 37/01* | (2006.01) |
| *B23P 11/00* | (2006.01) |

(52) U.S. Cl.
CPC . *A47J 37/01* (2013.01); *A21B 3/13* (2013.01); *B23P 11/00* (2013.01); *Y10T 29/49826* (2015.01)

(58) Field of Classification Search
USPC .......... 220/573.1, 495.03, 7, 519, 516, 517, 220/513, 509, 508, 608, 6, 4.28, 666
See application file for complete search history.

(56) References Cited

U.S. PATENT DOCUMENTS

| | | | |
|---|---|---|---|
| 170,991 A | 12/1875 | Conover | |
| 996,746 A | 7/1911 | Bloomer | |
| 1,088,964 A | 3/1914 | Buchman | |
| 1,667,354 A | 7/1924 | Lupien | |
| 2,341,762 A | 6/1942 | Conklin | |
| 2,952,379 A * | 9/1960 | Potter | 220/6 |
| 4,091,852 A | 5/1978 | Jordan et al. | |
| 4,455,925 A | 6/1984 | Handal et al. | |
| 5,051,354 A | 9/1991 | Henslee et al. | |
| 5,195,644 A | 3/1993 | Schmid | |
| 5,853,121 A | 12/1998 | Francisco | |
| 6,050,483 A | 4/2000 | Haraldsson et al. | |
| 6,065,394 A | 5/2000 | Gelderman | |
| 6,142,365 A | 11/2000 | Breitbach | |
| 6,149,053 A * | 11/2000 | Chatterton et al. | 229/407 |
| 6,279,469 B1 | 8/2001 | Bailey | |
| 6,305,937 B1 * | 10/2001 | Williams | 433/141 |
| 6,314,955 B1 | 11/2001 | Boetcker | |
| 6,523,989 B2 | 2/2003 | Carty | |
| 6,676,010 B1 | 1/2004 | Roseth et al. | |
| 6,684,760 B1 | 2/2004 | Rajusth et al. | |
| 7,011,014 B2 | 3/2006 | Siegel et al. | |
| 7,014,057 B2 | 3/2006 | Wang | |
| 7,028,834 B2 * | 4/2006 | Karpel | 206/5 |
| 7,637,417 B2 | 12/2009 | Fite, IV et al. | |
| 7,766,184 B2 | 8/2010 | Avery et al. | |
| 7,845,508 B2 | 12/2010 | Rothschild et al. | |
| 7,850,035 B2 | 12/2010 | Lion et al. | |

(Continued)

*Primary Examiner* — Stephen Castellano
(74) *Attorney, Agent, or Firm* — K&L Gates LLP

(57) ABSTRACT

A convertible and folding cooking pan includes a base plate and a plurality of pivotable and adjustable flanges removably coupled thereto. The flanges are moveable from a first substantially flat position to a second substantially upright position. When in the substantially upright position, the flanges are securely connected to define a baking zone with base plate and the flanges. In one embodiment, a plurality of sets of flanges are configured on the base plate to enable the selectable configuration of a first baking zone using the first set of flanges or a second, differently-sized baking zone using the second set of flanges.

22 Claims, 11 Drawing Sheets

(56) References Cited

U.S. PATENT DOCUMENTS

| | | |
|---|---|---|
| 7,861,886 B2 | 1/2011 | Lion et al. |
| 2004/0182858 A1* | 9/2004 | Smyers ............................ 220/6 |
| 2004/0184511 A1 | 9/2004 | Kwon |
| 2004/0217109 A1 | 11/2004 | Chang |
| 2005/0210838 A1* | 9/2005 | Mahon et al. ................... 53/472 |
| 2006/0169690 A1 | 8/2006 | Rothschild et al. |
| 2006/0169691 A1 | 8/2006 | Rothschild et al. |
| 2006/0225725 A1 | 10/2006 | Rinaldo |
| 2007/0084064 A1 | 4/2007 | Fite, IV et al. |
| 2007/0175895 A1 | 8/2007 | Vlahos |
| 2007/0215516 A1* | 9/2007 | Sumi ............................ 206/711 |
| 2008/0099476 A1 | 5/2008 | Fung |
| 2010/0138320 A1 | 6/2010 | Gavarini |
| 2010/0288779 A1 | 11/2010 | Avery et al. |
| 2011/0011856 A1 | 1/2011 | Rothschild et al. |

* cited by examiner

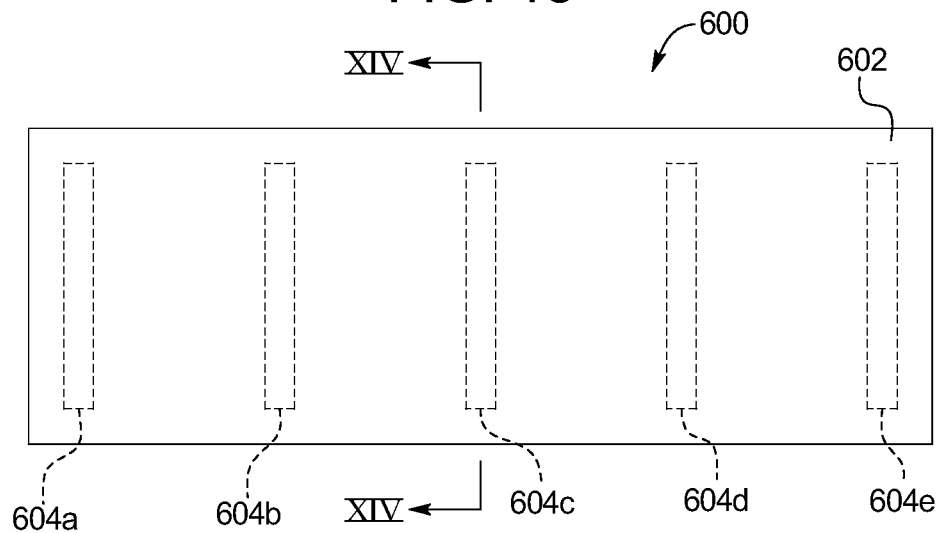
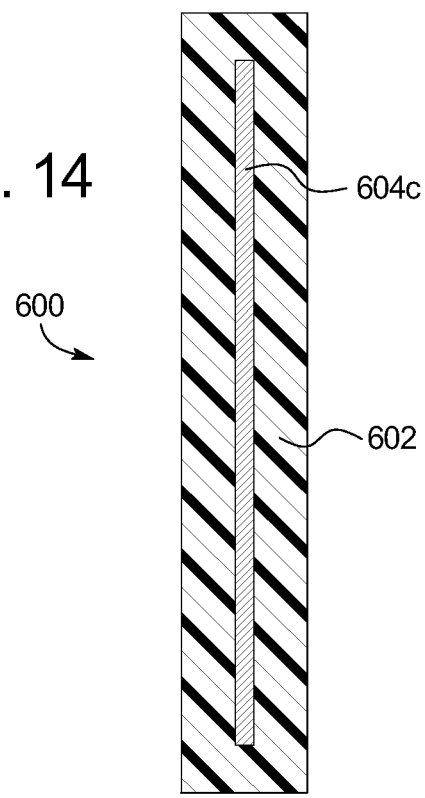

BAKING APPARATUS WITH MULTIPLE FUNCTIONS AND SIZES

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Baking equipment and cookware items are available in a variety of different sizes and dimensions based upon the food being baked. A bread loaf pan is narrower with higher walls to allow proper rising of the baking bread. For example, a typical size of such a bread pan measures 9 inches long by 5 inches wide by 3 inches high. Unlike a bread loaf pan, a cake pan tends to be wider and shorter, due primarily to ensure the ingredients included bake thoroughly and correctly. For example, a typical size of such a cake pan measures 8 inches square by 1.5 inches high. Because of the different sizes and specifications of each cookware item corresponding to the particular food product, a baker who wishes to bake a variety of foods requires several baking pans and tools varying in size.

BRIEF DESCRIPTION OF THE FIGURES

FIG. 13 is a side view of one example flange of an adjustable cookware device according to one example embodiment of the present invention.

FIG. 14 is a cross-sectional view of the example flange depicted in FIG. 13 according to one example embodiment of the present invention.

DETAILED DESCRIPTION

It will be appreciated that different food items require different sized baking receptacles depending upon serving size, ingredient type and baking time and temperature. Acquiring a range of different pans, trays and other cookware items can be quite costly and also burdensome to store and keep conveniently accessible. Having multitude of cookware items and baking equipment on hand requires the dedication of extra storage or cupboard space, as well as significant initial cost and investment to acquire the necessary tools. By combining one or more different sized cookware devices into a single adjustable cookware device, both excess cost and wasted storage space are minimized. This might be particularly useful in environments where space as at a premium, for example in small kitchens, such as those of apartment dwellers.

The present disclosure is generally directed to adjustable cookware devices that are convertible from a flat baking sheet to at least a first sized baking pan. In various example embodiments, the adjustable cookware device includes a base sheet and a plurality of flanges pivotably connected to the base sheet. In various embodiments, the plurality of flanges are adjustable from a first substantially flat position with respect to the base sheet to a second substantially upright position with respect to the base sheet. When in the second substantially upright position, the plurality of flanges can be secured to one another to define a first baking zone. In various embodiments, the first baking zone is similar to the shape of a common baking pan, with the plurality of flanges serving as the baking pan walls and the base sheet serving as the baking pan base. In various embodiments, the base sheet includes more than one set of flanges, each set of flanges corresponding to a different sized baking zone when arranged in the respective second substantially upright position. In various embodiments, the adjustable cookware device has several different operating configurations, depending upon the arrangement and dimensions of the plurality of flanges operably connected to the base sheet.

Figure 1:
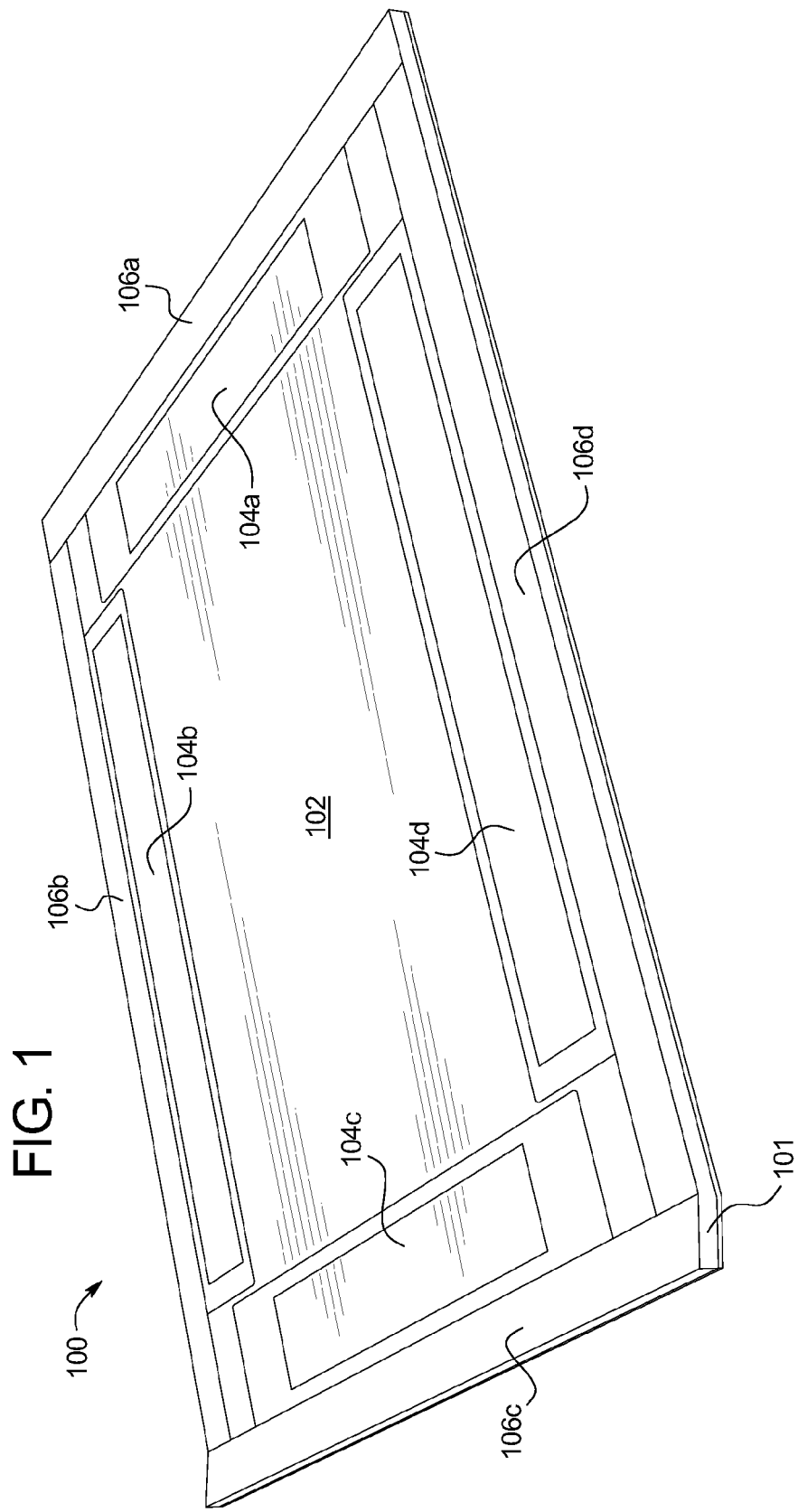
FIG. 1 is a view of an example assembled adjustable cookware device in a flattened configuration according to one example embodiment of the present invention.

Referring now to FIG. 1, a flattened example of one adjustable cookware device embodiment is discussed and illustrated. The adjustable cookware device 100 includes a plurality of flanges 104a, 104b, 104c, 104d, 106a, 106b, 106c and 106d which are each adjusted into a position that is substantially flat with respect to base sheet 102. In such a flat configuration, the adjustable cookware device 100 can be used as a cookie sheet or baking pan. It should be appreciated that in various embodiments discussed in more detail below, the base sheet 102 is designed to have a plurality of cutouts where the flanges 104a to 104d and 106a to 106d are to be attached. In one such embodiment, when the flanges 104a to 104d and 106a to 106d are pivoted to a flat position, the base sheet 102 and the flanges 104a to 104d and 106a to 106d combine to define a substantially coplanar surface on which items can be baked. It should be appreciated that the base sheet 102 and the flanges 104a to 104d and 106a to 106d are designed so that when used in the flat configuration as a baking sheet, the thickness is substantially constant throughout the adjustable cookware device 100. Therefore, in various flat-configuration embodiments, assuming even heat application by the oven or other heat source, the heat distribution is consistent across the entire adjustable cookware device 100.

In various embodiments, the adjustable cookware device includes four separate pivotable flanges arranged in a rectangular or square array on the base sheet. In one embodiment (not illustrated), the adjustable cookware device includes only four pivotable flanges. In various embodiments, when the four flanges are pivoted to an upright position with respect to the base sheet, the flanges create four walls defining a rectangular or square baking pan or baking zone. It should be appreciated that, in various embodiments, a cutout portion of the base sheet, from which the four flanges are pivoted upright, provides a peripheral surface surrounding the rectangular baking pan on which additional food items may be baked. As will be discussed later, when the four flanges are pivoted into the upright configuration to define the baking zone, each of the seams are secured and constructed to prevent leakage and uneven baking.

Referring again to FIGS. 1 to 3, in various embodiments, the adjustable cookware device 100 includes eight separate pivotable flanges. As shown in FIG. 1, one such eight-flange embodiment includes two sets of four flanges, each arranged in a rectangular or square array on the base sheet 102. The first or inner set of four flanges 104a, 104b, 104c and 104d are each arranged perpendicularly to one another in a rectangle. The flanges 104a, 104b, 104c and 104d are pivotably connected to base plate 102 and arranged in a flat configuration so that the tops of each of flanges 104a, 104b, 104c and 104d are substantially coplanar with the center portion of base plate 102. Similarly, FIG. 1 illustrates a second or outer set of four flanges 106a, 106b, 106c and 106d, each arranged perpendicularly to one another in the shape of a rectangle. The flanges 106a, 106b, 106c and 106d are each pivotably connected to base plate 102 and arranged in a flat configuration so that the tops of each of flanges 106a, 106b, 106c and 106d are substantially coplanar with the center portion of base plate 102 and the tops of each of flanges 104a, 104b, 104c and 104d.

It should be appreciated that in the illustrated embodiment of FIG. 1, the first or inner set of flanges 104a to 104d have a first width and the second or outer set of flanges 106a to 106d have a second width less than the first width. As discussed in more detail below, due to the flange width differential between the 104 series of flanges and the 106 series of flanges, the resulting first and second baking zones defined when the flanges are configured in an upright position have differing depths (see FIGS. 2 and 3).

Figure 2:
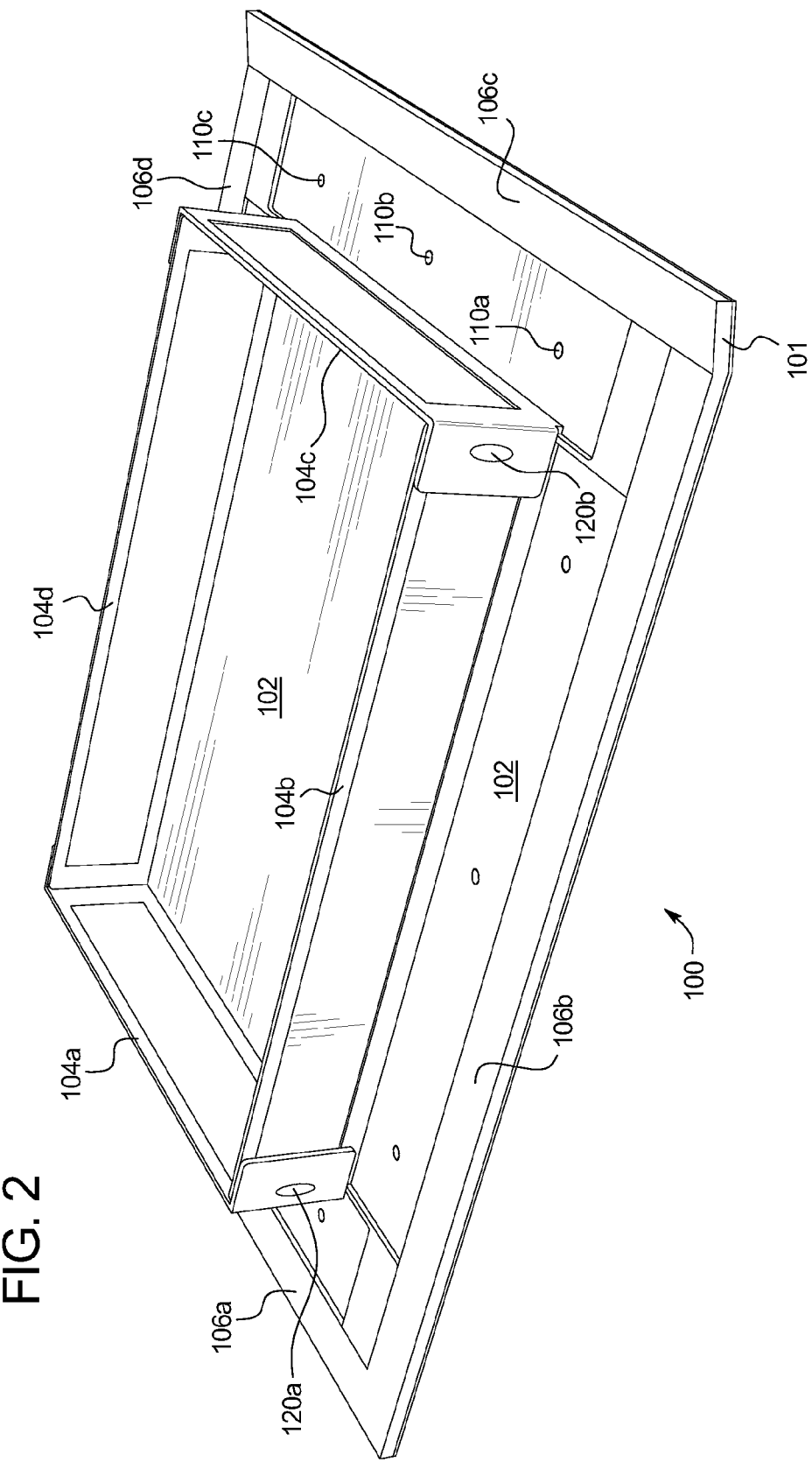
FIG. 2 is a view of an example assembled adjustable cookware device in an first upright configuration according to one example embodiment of the present invention.

Referring now to FIG. 2, one example embodiment of a first upright configuration of the adjustable cookware device 100 discussed in FIG. 1 is illustrated and discussed. In FIG. 2, the flanges 104a, 104b, 104c and 104d have been pivoted from a flat configuration (show in FIG. 1) up to an upright configuration that is substantially perpendicular to the base sheet 102. In various embodiments, base plate 102 includes a plurality of cutout portions 204a, 204b, 204c 204d now visible with the flanges 104a to 104c upright. The cutout portions 204a to 204d are dimensioned such that their depth is roughly equal to the thickness of flanges 104a to 104d. Therefore, when the flanges 104a to 104d are pivoted into a flattened configuration, as discussed above and illustrated in FIG. 1, the flanges 104a to 104d lie flat and substantially coplanar and flush with the top of center portion of base plate 102.

Figure 4:
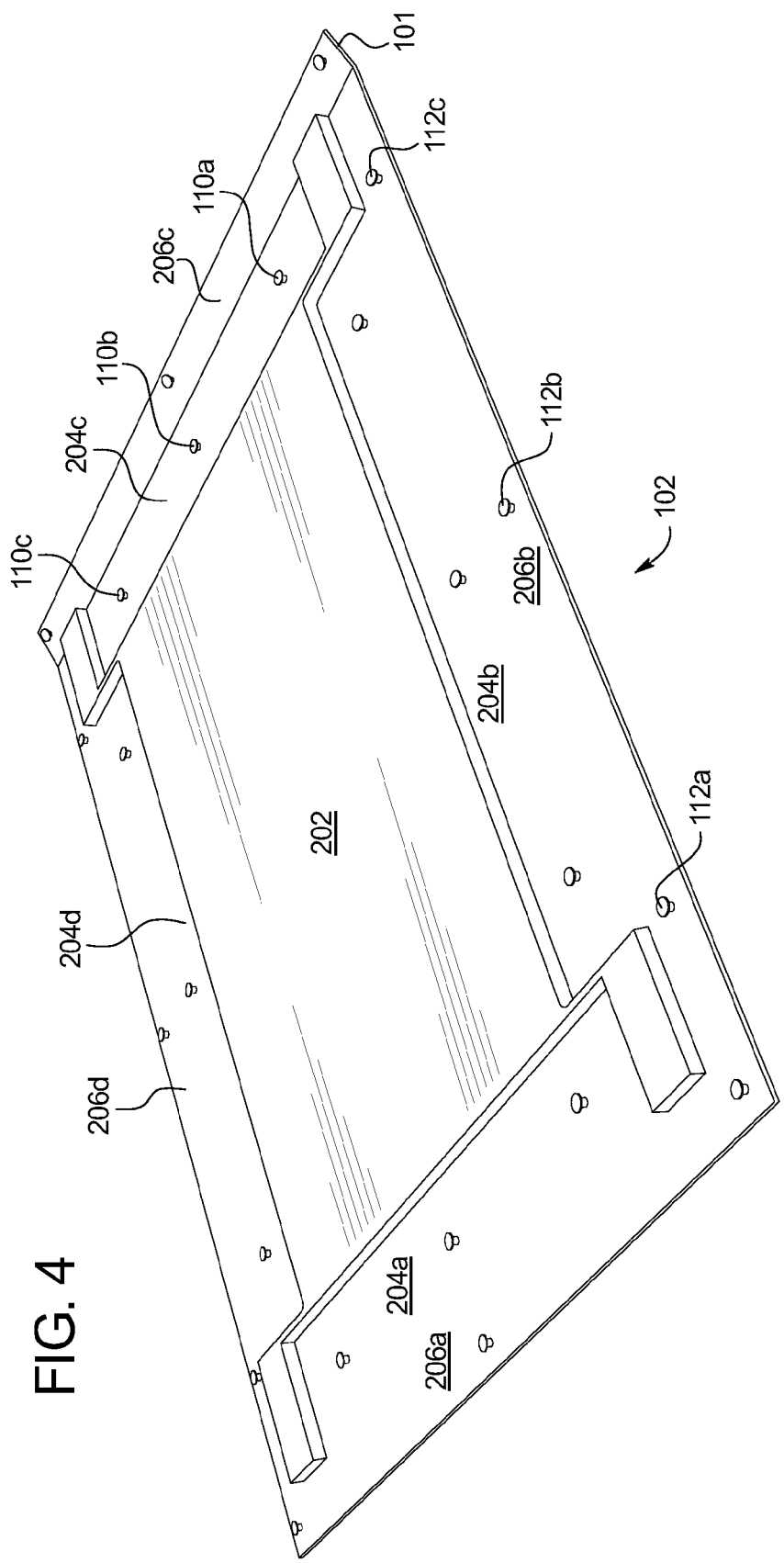
FIG. 4 is a view of an example base plate of a disassembled adjustable cookware device according to one example embodiment of the present invention.
Figure 5:
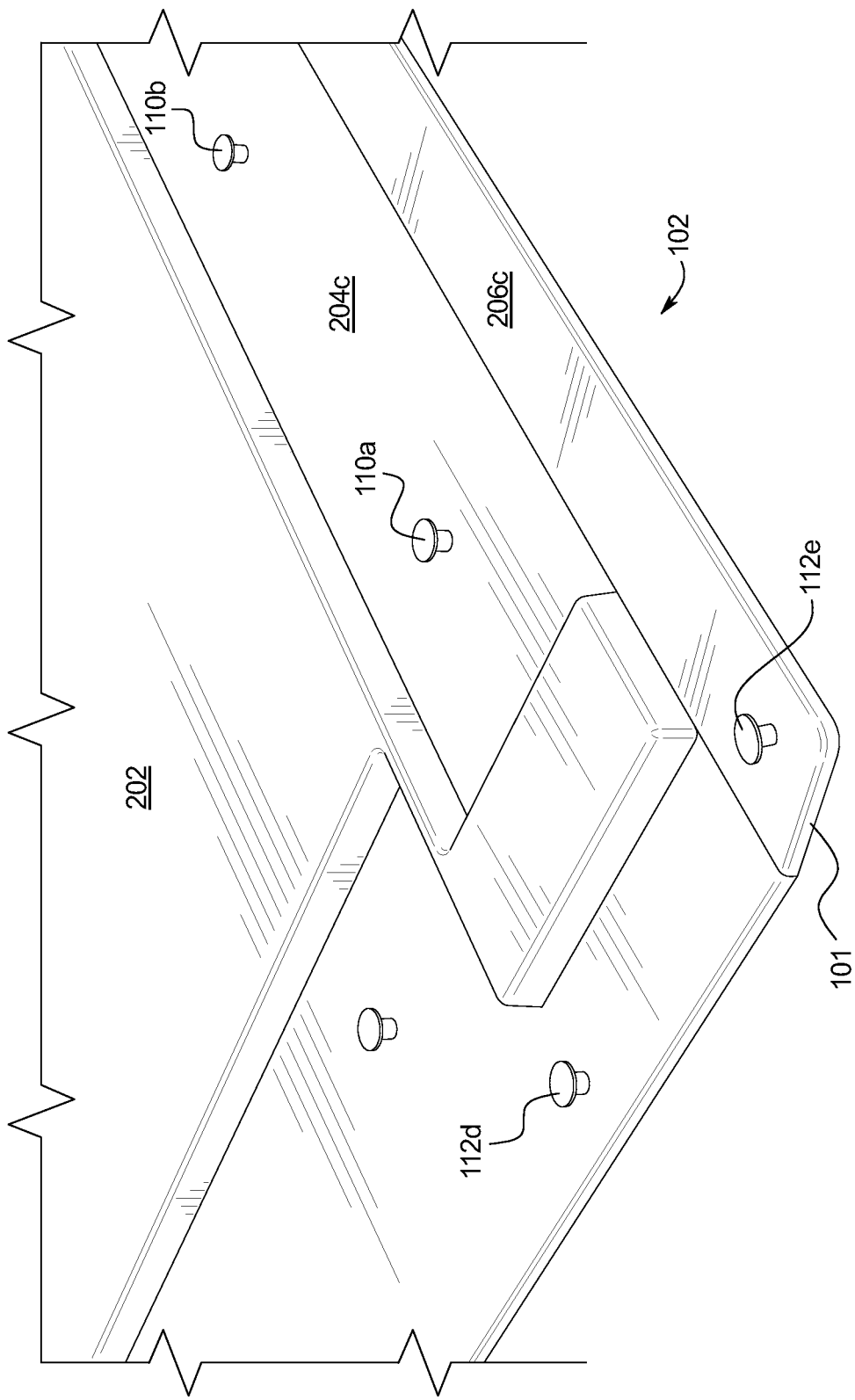
FIG. 5 is a partial view of an example base plate of a disassembled adjustable cookware device according to one example embodiment of the present invention.
Figure 6:
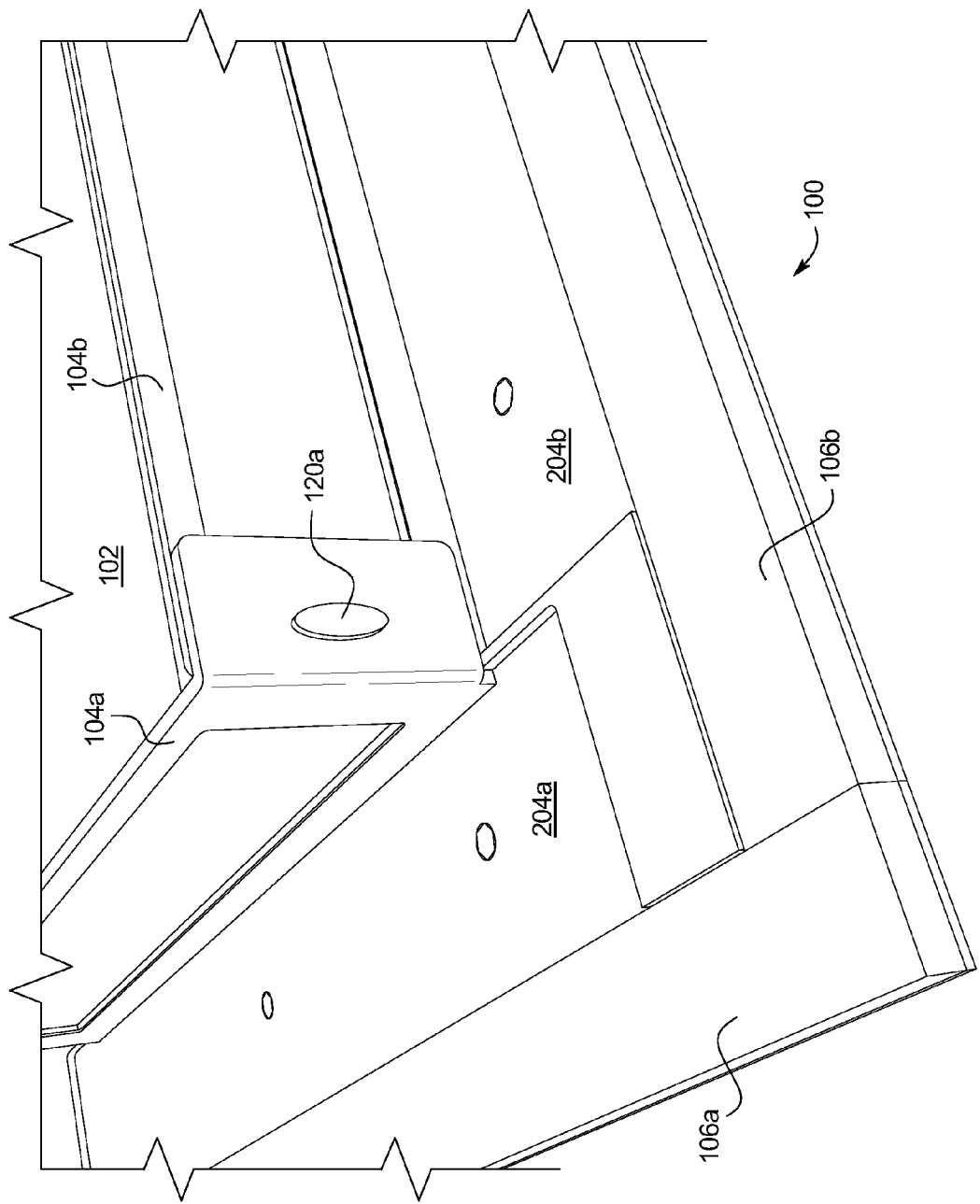
FIG. 6 is a partial view of an example assembled adjustable cookware device in a first upright configuration according to one example embodiment of the present invention.

As illustrated in one example embodiment in FIG. 2, within the cutout portions 204a, 204b, 204c and 204d of various embodiments, the base plate 102 includes a plurality of integrated bosses 110a, 110b, 110c, 111a, 111b and 111c. It should be appreciated that, while FIG. 2 only shows two full sides of the integrated bosses in cutouts 204b and 204c, in FIG. 4, additional bosses corresponding to flanges 204a and 204d are disposed in a mirror configuration in mirrored cutouts 204a and 204d respectively. It should be appreciated that in various embodiments, cutout 204b mirrors cutout 204d and cutout 204a mirrors cutout 204c. Similarly, in various embodiments, bosses 110a to 110c in cutout 204c are mirrored in cutout 204a and bosses 111a to 111c in cutout 204b are mirrored in cutout 204d. It should also be appreciated that, by making flanges 104a and 104c identical and interchangeable and flanges 104b and 104d identical and interchangeable, a user need not worry about matching unique components after disassembly and cleaning.

In various embodiments, the integrated bosses 110a, 110b and 110c and 111a, 111b and 111c are configured to interface with matching mating female voids integrated into the bottom side of corresponding flanges 104c and 104b. In the flat configuration illustrated in FIG. 1, the female voids of flange 104c are snap secured with the male bosses 110a, 110b and 110c to keep flange 104c secured in the desired flat position. As discussed in more detail below, in various embodiments both the female voids of the flanges 104a to 104d and the male bosses 110a to 110c and 111a to 111d are constructed with durable silicone. In various alternative embodiments, the female voids and male bosses, as well as the flanges are constructed with rubber or another suitable material discussed in more detail below. It should be appreciated that, when snapped into the flat secure position, the flanges 104a to 104d are held with sufficient force that the heat and expansion experienced by being put into and out of the oven is not sufficient to release the flanges unintentionally. However, in various embodiments, it should be appreciated that the flanges are not too tightly secured such that a user has a difficult time unsnapping the flanges from the bosses to use the pivotable upright embodiment.

End flanges 104a and 104c each include two opposing flap portions 300a, 300d and 300b, 300c respectively. In various embodiments, each flap portion 300a to 300d is integrally connected to one of the end flanges 104a, 104c and constructed to pivot with respect to its respective base end flange when unsnapped from the corresponding bosses. Viewing FIG. 2, it will be appreciated that each flap is enabled to pivot with respect to the end flange in part because its freedom of motion is not inhibited by being pivotably connected to the base plate 102. While the center portion of end flanges 104a and 104c are pivotably connected to the base plate 102, the end flaps 300a to 300d are not. It should be appreciated that in various embodiments, each end flap 300a to 300d includes the definition of at least one female void 121a to 121d respectively.

In various embodiments, the bottom surface of side flange 104b includes boss portions 120a, 120b disposed on opposing ends of the flange 104b. Although not illustrated in FIG. 2, it should be appreciated that flange 104d also includes similar boss portions 120c, 120d on opposing sides of its bottom portion. In various embodiments, the boss portions 120a to 120d are configured to integrate with female voids 121a to 121*d* respectively. It should be appreciated that the mating of bosses 120*a* to 120*d* with female voids 121*a* to 121*d* is mechanically similar to the mating of bosses 110*a* to 110*d* and 111*a* to 111*d* with the corresponding female voids disposed on the bottom surface of the flanges. It should be appreciated that, to keep the seams from leaking during baking, as discussed in more detail below, the bosses 120*a* to 120*d* and the voids 121*a* to 121*d* in various embodiments are constructed to be slightly larger and more robust to provide more holding force and sturdy snapping than the flat-snap bosses 110*a* to 110*d* and 111*a* to 111*d*.

To adjust the adjustable cookware device 100 from the flat configuration of FIG. 1 to the first upright configuration of FIG. 2, flanges 104*a* to 104*d* are each unsnapped from the respective securing bosses discussed above, and are snapped together with vertical bosses 120*a* to 120*d* and corresponding voids 121*a* to 121*d* that are integrated into each of the flanges 104*a* to 104*d*. In various embodiments, it should be appreciated that, in the upright configuration, the flanges 104*a*, 104*b*, 104*c* and 104*d* are not perfectly perpendicular to the base plate 102 but are pivoted from a 0 degree angle defined by each flange 104*a* to 104*d* with respect to the corresponding cutout portion 204*a* to 204*d* of the base plate 102 to an acute angle defined by each flange 104*a* to 104*d* with respect to the cutout portion 204*a* to 204*d* of the base plate 102. It will be appreciated that making the minor geometrical adjustments to allow such an acute angle (as opposed to a right angle) results in various embodiments in which the baking zone defined by the upright flanges has slightly outward-tapered walls, which may be preferable to cooks and bakers.

It should also be appreciated that, in various embodiments, the flanges 104*a*, 104*b*, 104*c* and 104*d* are pivoted from a 0 degree angle defined by each flange 104*a* to 104*d* with respect to the corresponding cutout portion 204*a* to 204*d* of the base plate 102 to an obtuse angle defined by each flange 104*a* to 104*d* with respect to the cutout portion 204*a* to 204*d* of the base plate 102. It will be appreciated that making the minor geometrical adjustments to allow such an obtuse angle (as opposed to a right or acute angle) results in various embodiments in which the baking zone defined by the upright flanges has slightly inward-tapered walls, which may be preferable to cooks and bakers.

In the embodiment discussed above and illustrated in FIG. 2, the flanges 104*a* to 104*d* are pivoted to an upright configuration to define a first baking zone, which has dimensions of: length equal to the length of the side flanges 104*b*, 104*d*; width equal to the length of the end flanges 104*a*, 104*c* minus the respective end flaps 300*a* to 300*d*; and depth equal to the height of each of the flanges 104*a* to 104*d*.

Figure 3:
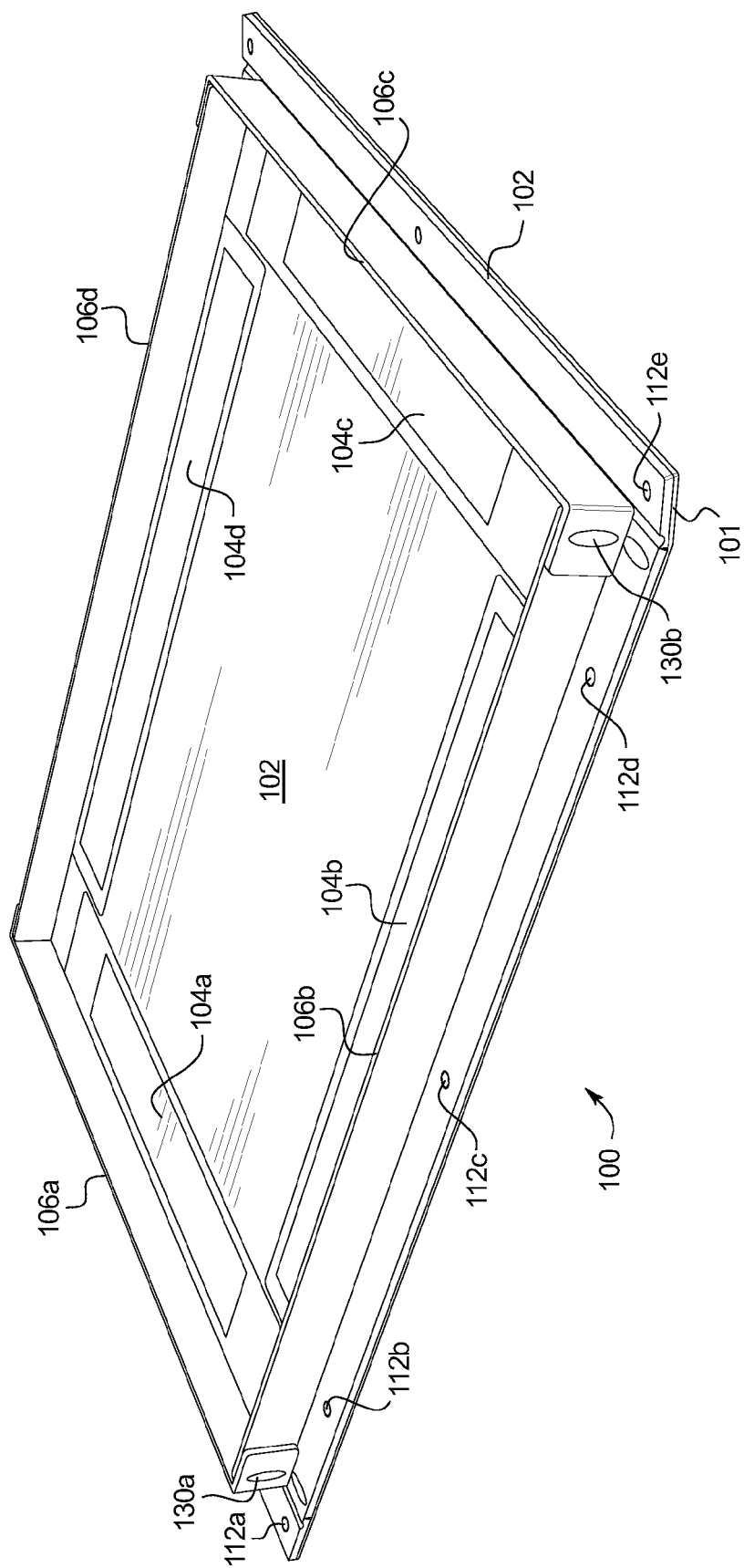
FIG. 3 is a view of an example assembled adjustable cookware device in a second upright configuration according to one example embodiment of the present invention.

Referring now to FIG. 3, an example embodiment of the adjustable cookware device in a second upright configuration is discussed and illustrated. It should be appreciated that the second upright configuration utilizes the second set of four flanges 106*a*, 106*b*, 106*c* and 106*d*. In the second upright configuration, each of the first four flanges 104*a* to 104*d* are pivoted into the flat position and secured using the respective bosses and female voids defined in the outside surface of each of the flanges. In the second upright configuration, the user can convert the adjustable cookware device 100 into a baking zone or pan that is of a different length, width and depth than the baking zone or pan defined in the first upright configuration discussed above and illustrated in FIG. 2.

In various embodiments, flanges 106*a* to 106*d* are attached to base plate 102 in a similar fashion as flanges 104*a* to 104*d* discussed above. The flanges 106*a* to 106*d* in their flattened configuration occupy the cutout portions 206*a* to 206*d* of base plate 102, respectively. As seen in FIG. 3 in conjunction with the cutout view of base plate 102 in FIG. 4, raised sections 400*a*, 400*b*, 400*c* and 400*d* provide points of contact between the flanges 106*a* to 106*d* and the base plate. It should be appreciated that, in various embodiments: flange 106*a* is pivotably connected to the base plate 102 on one end at raised portion 400*d* and on the other end at raised portion 400*a*; flange 106*b* is pivotably connected to the base plate 102 on one end at raised portion 400*a* and on the other end at raised portion 400*b*; flange 106*c* is pivotably connected to base plate 102 on one end at raised portion 400*b* and on the other end at raised portion 400*c*; and flange 106*d* is pivotably connected to base plate 102 on one end at raised portion 400*c* and on the other end at raised portion 400*d*. In alternative embodiments, discussed in further detail below, the attachment of flanges 104*a* to 104*d* and 106*a* to 106*d* are connected to base plate 102 in various different ways.

Similar to the cutout portions 204*a* to 204*d* of base plate 102, cutout portions 206*a* to 206*d* also include a plurality of bosses or protrusions configured to interface with each of the respective flanges 106*a* to 106*d* when in the flattened position. As seen in FIG. 3, the bosses in cutout portions 206*b* and 206*c*, which correspond with flanges 106*b* and 106*c* respectively, are illustrated. In cutout portion 206*b*, bosses 112*a*, 112*b* and 112*c* protrude from base plate 102. Flange 106*b* includes female voids or depressions on its bottom surface that correspond to each of bosses 112*a*, 112*b* and 112*c*. Similarly, in cutout portion 206*c*, bosses 113*a*, 113*b* and 113*c* protrude from base plate 102. Flange 106*c* includes female voids or depressions on its bottom surface that correspond to each of bosses 113*a*, 113*b* and 113*c*. Although not illustrated in FIG. 3, flanges 106*a* and 106*d* also include a plurality of similar female voids and the respective cutout portions 206*a* and 206*d* of base plate 102 include a plurality of matching bosses or protrusions to mate with the voids.

As seen in FIG. 3, in various embodiments, end flanges 106*a* and 106*c* each include two opposing end flaps 302*a*, 302*d* and 302*b*, 302*c* respectively. Similar to the mechanism discussed above with respect to flanges 104*a* to 104*c*, the flaps 302*a* to 302*d* corresponding to flanges 106*a* and 106*c* each include a female void 131*a* and 131*b*. It should be appreciated that the illustrated exemplary female voids 131*a* and 131*b* defined on the flaps 302*a* and 302*b* are sized to mate with corresponding bosses or protrusions 130*a* and 130*b* respectively disposed on flange 106*b*. It should be appreciated that, although not fully illustrated, each of flaps 302*c* and 302*d* also include female voids similar to 131*a* and 131*b* and flange 106*d* also includes corresponding bosses or protrusions similar to 130*a* and 130*b*.

In the embodiment discussed above and illustrated in FIG. 3, the flanges 106*a* to 106*d* are pivoted to an upright configuration to define a second baking zone, which has dimensions of: length equal to the length of the side flanges 106*b*, 106*d*; width equal to the length of the end flanges 106*a*, 106*c* minus the length of respective end flaps 302*a* to 302*d*; and depth equal to the height of each of the flanges 106*a* to 106*d*.

It should be appreciated that, when the side flanges and end flanges are each suitably connected to one another in an upright configuration, each seam is liquid tight and sealed to prevent any pre- or post-baking leakage of or seepage ingredients within the baking zone. It should also be appreciated that, the seams along the pivoted edges of each of the flanges are also liquid tight and sealed with respect to the base plate to prevent any pre- or post-baking leakage or seepage of ingredients within the baking zone.

It should be appreciated that, in various embodiments, different adjustable cookware devices can be designed and manufactured to include differing sized flanges and thereby offer to the end user different popular or standardized baking zones useable with one device. For example, in one embodiment, the inner or first flanges are each dimensioned 8 inches long by 1.5 inches wide. After in an upright configuration, this first baking zone would create an 8 inches by 8 inches by 1.5 inches cake pan, which is a typical size that corresponds to many recipes. In another embodiment, in addition to the 8 inch by 8 inch by 1.5 inch inner pan, the outer or second flanges are dimensioned to create a 9 inch by 13 inch by 2 inch shallow cake plan. It should be appreciated that any number of permutations or combinations of flange sizes can be combined into various embodiments of the present disclosure.

In various embodiments, the general dimensions of the flange sizes are standardized to enable interchangeability of flanges between several differently-sized adjustable cookware devices. For example, suppose a user wished to use the 8 inch by 8 inch sized pan discussed above, but rather than having a depth (wall-size) of 1.5 inches, the user wished to have a depth of 3 inches. Due to the interchangeability and standardization of the flanges and base plates, a separate set of flanges of the dimensions 8 inches by 8 inches by 3 inches could be inserted into the base plate. So long as the length of the flanges fits with the corresponding flange-lengths in the base plate, the height of the flanges in the upright configuration can be variable. This standardization provides greater flexibility as to the size and customization of the baking zone. In various embodiments, different sized flanges of a similar length are available separately from the adjustable cookware device to enable the user to create any depth custom baking zone desired. It should be appreciated that, in various embodiments in which the flanges are wider, a secondary securing mechanism can be employed to ensure seal-tight seams between the flanges. In one such embodiment, the secondary securing mechanism is a second set of bosses above the first set of bosses described above.

In various alternative embodiments, the adjustable cookware device is round. In one such embodiment, the base sheet is round, and each of a plurality of flanges are configured to adjust from a flat position to an upright position to define a round, oblong or elliptical baking zone. It should be appreciated that, in various embodiments the baking pan is useable as a pizza sheet, and the baking zone defined by upright-oriented flanges is useable as a pie dish. The baking zone in various circular or oblong embodiments is defined with two semi-circular flanges that pivot upward and connect to one another and the base sheet to form the circular or oblong baking zone. In other embodiments, the circular or oblong baking zone is defined with four flanges configured to each connect to one another and to the base sheet to form the baking zone. It should be appreciated that any number of various embodiments or configurations of shapes and sizes is contemplated herein.

In various embodiments, the adjustable cookware device is configured to include additional flanges to create additional cooking zones. For example, in one embodiment, a baker using the adjustable cookware device in a first configuration to bake brownies could also use the outer periphery of the adjustable cookware device to cook other foods, such as cookies. It should be appreciated that to use multiple areas of the adjustable cookware device simultaneously, the goods must also require similar temperatures and baking durations. In various embodiments, the adjustable cookware device includes one or more bisecting flanges which divide a baking zone into two or more individual baking zones. Such an embodiment allows for baking of multiple similarly-sized food items simultaneously. One example embodiment of such a bisecting flange configuration is if a fifth flange was integrated into the first upright configuration of FIG. 2 extending across top surface 202 from flange 104b to 104d. It should be appreciated that any number and combination of flanges are contemplated for use with the base plates of various embodiments. For example, in one embodiment, one or more diagonal collapsible flanges are configured to bisect the baking zone and create two or more sub-baking zones. In other example embodiments, a series of perpendicular or diagonal patterned internal flanges are configured to create several smaller baking zones to create, for example, a plurality of individual brownies or cakes.

It should be appreciated that, in various embodiments, the flanges are removably connected to the base plate. In other various embodiments, the flanges are not removably coupled to the base plate. In one such embodiment, the flanges are hinged permanently to the base plate. It should also be appreciated that in various embodiments, some flanges are permanently hinged to the base plate whereas other flanges in the same embodiment are removably coupled or hinged to the base plate. Any combination of permanently and removably coupled flanges are contemplated for use in various embodiments.

In various embodiments, the adjustable cookware device is constructed with temperature resistant materials capable of withstanding heat up to at least about 550 degrees Fahrenheit. In other embodiments, the device, with or without post-sale modification can withhold up to about 900 degrees Fahrenheit. In one embodiment, the flanges are constructed with multiple different materials, such as one or more of silicone, plastic, rubber and metal. In various embodiments, the materials used for construction of the base plate of the adjustable cookware device as well as the flanges is a non-stick material, aiding in the removal of baked food items as well as the cleaning of the adjustable cookware device. In various embodiments, the material is dishwasher safe. It should be appreciated that, for purposes of this description, all references to the specific material of the flanges, such as silicone, is not intended to limit the types of materials used for that purpose in various alternative embodiments. The present disclosure also contemplates the use of alternate materials, such as plastic, rubber, synthetics or other appropriate cook-safe surface materials, for use in both the flanges and the base plate. In some embodiments, the flanges include a different material than the base plate.

It should be appreciated that both the non-stick and the pivotable qualities of the flanges and the base plate allow a user to more easily access the finished food item. For example, in various embodiments, when the food item has been completely baked, the user can allow it to cool and then pivot the flanges down from the upright position, making the finished product more easy to cut, serve and display. In various embodiments, the adjustable cookware device is configured to engage with a corresponding support system to be used as an aesthetically pleasing serving tray.

It should be appreciated that in various embodiments, the surface of the adjustable cookware device which contacts the food being baked is a silicone material, and is supported with various metal or otherwise rigid inserts. In one embodiment, the metal or rigid structural insert is completely molded over or encapsulated by the silicone material. For example, in one embodiment, the metal insert or structural rigid member inside the silicone flanges or base plate is a rod configured to support the respective portion of the adjustable cookware device. In another embodiment, the metal insert or structural rigid member is a metal plate. In another embodiment, the metal insert or structural rigid member is a metal mesh plate. In another embodiment, the metal insert or structural rigid member is a bent metal bar. It should be appreciated that various combinations of the different support systems could be used in a single adjustable cookware device embodiment. It should also be appreciated that the metal or rigid insert is configured to help ensure even heat distribution when the adjustable cookware device is placed in the oven or baking environment. In various embodiments, the rigid structural member is molded into the respective silicone member at the time of manufacture.

Referring now to FIGS. 7 to 14, various different embodiments of flanges are discussed and illustrated. It should be appreciated that the structural rigid insert can take various alternative shapes as well as materials. It should be appreciated that any combination of materials, alternative shapes and sizes of flanges can be used in various contemplated embodiments of the disclosure.

Figure 7:
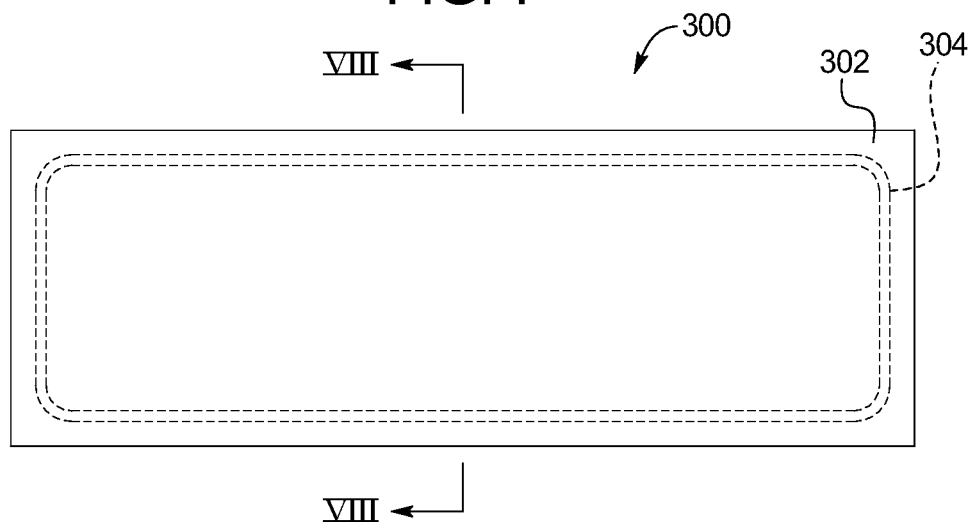
FIG. 7 is a side view of one example flange of an adjustable cookware device according to one example embodiment of the present invention.
Figure 8:
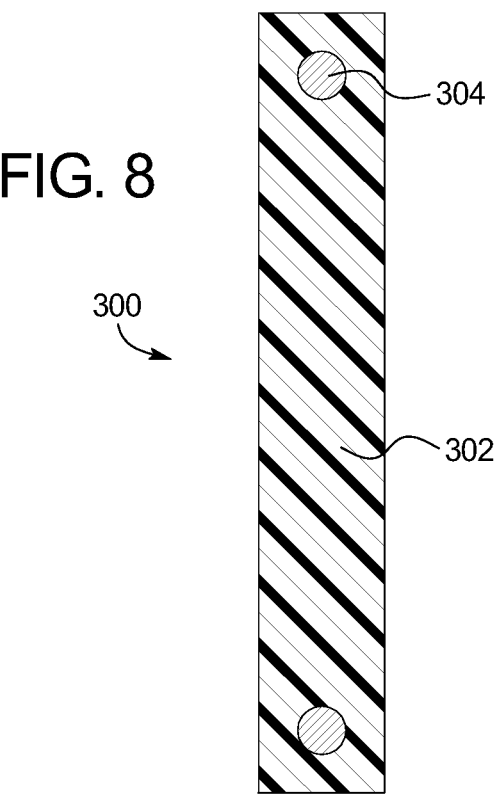
FIG. 8 is a cross-sectional view of the example flange depicted in FIG. 7 according to one example embodiment of the present invention.

Referring specifically to FIGS. 7 and 8, a side view and cross-sectional view of one embodiment of a flange 300 of the present disclosure is illustrated. The structural rigid insert 304 included in the flange 300 of FIG. 7, for example, is a round tube or rod bent, formed or assembled into a continuous loop, roughly following the perimeter of the flange 300. It should be appreciated that in various embodiments, the silicone or other material 302 is molded over the structural rigid insert 304. In various embodiments, the structural rigid insert 304 of FIGS. 7 and 8 is arranged or formed in any suitable shape within the molded over silicone material 302 to provide suitable structural support and integrity to the flange 400. As seen in FIG. 8, the cross-sectional view taken along line VIII-VIII of FIG. 7 is illustrated. The structural rigid insert 304 has a circular cross section. In various alternative embodiments, the structural rigid insert 302 is a tube or pipe, which has a hollow cross-sectional center rather than a solid cross section as illustrated in FIG. 8.

Figure 9:
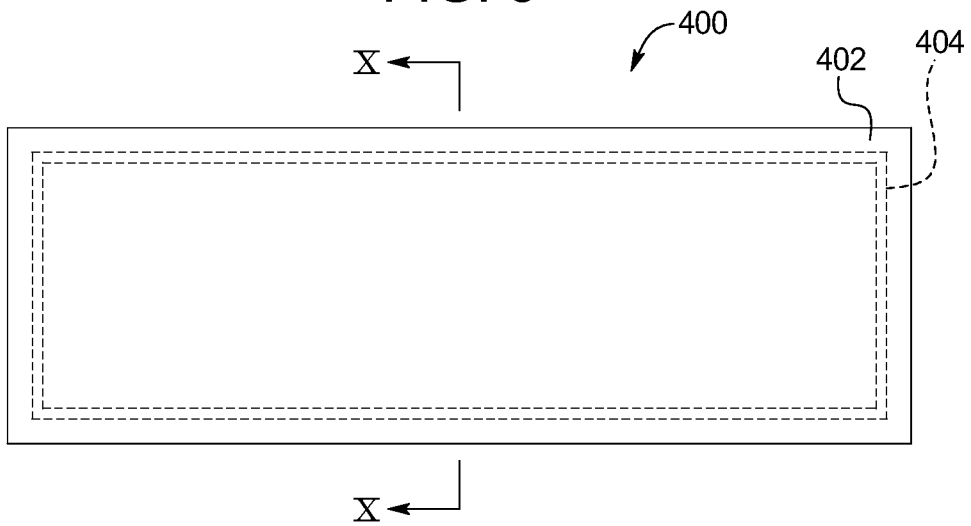
FIG. 9 is a side view of one example flange of an adjustable cookware device according to one example embodiment of the present invention.
Figure 10:
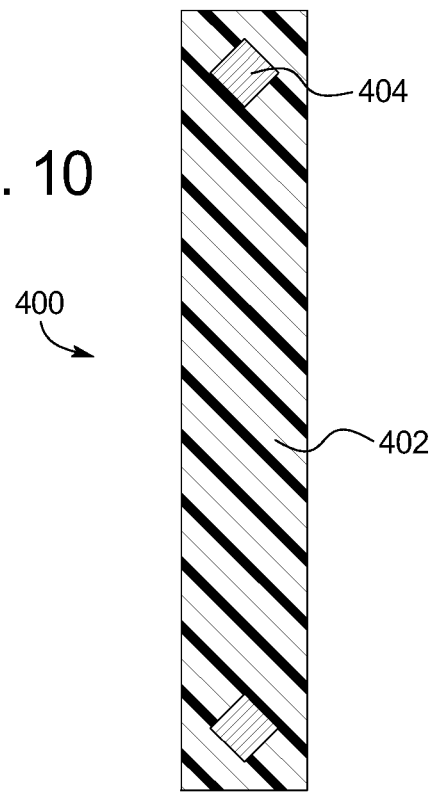
FIG. 10 is a cross-sectional view of the example flange depicted in FIG. 9 according to one example embodiment of the present invention.

Referring now to FIGS. 9 and 10, a side view and cross-sectional view of one embodiment of a flange 400 of the present disclosure is illustrated. The structural rigid insert 404 included in the flange 400 of FIG. 9, is a square or rectangular tube or rod bent, formed or assembled into a square or rectangular shape, roughly following the perimeter of the flange 400. In various embodiments, the structural rigid insert 404 of FIGS. 9 and 10 is arranged in any suitable shape or pattern within the molded over silicone material 402 to provide suitable structural support and integrity to the flange 400. As seen in FIG. 10, the cross-sectional view taken along line X-X of FIG. 9 is illustrated. The structural rigid insert 404 has a square or rectangular cross section. In various alternative embodiments, the structural rigid insert 402 is a hollow square or rectangular bar with a hollow cross-sectional center rather than a solid cross section as illustrated in FIG. 10.

Figure 11:
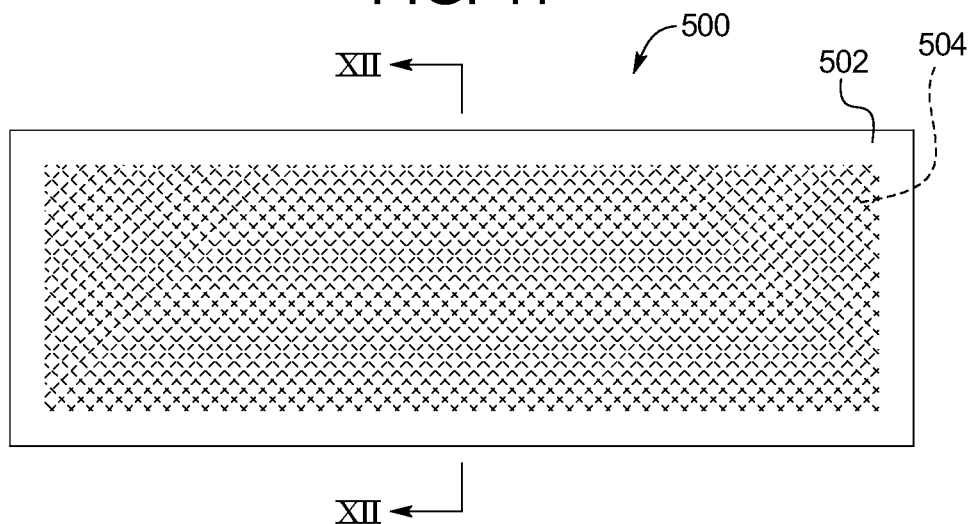
FIG. 11 is a side view of one example flange of an adjustable cookware device according to one example embodiment of the present invention.
Figure 12:
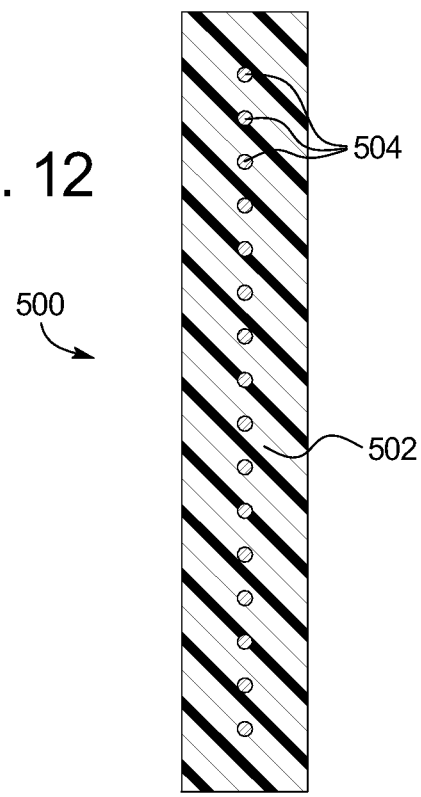
FIG. 12 is a cross-sectional view of the example flange depicted in FIG. 11 according to one example embodiment of the present invention.

Referring now to FIGS. 11 and 12, a side view and cross-sectional view of one embodiment of a flange 500 of the present disclosure is illustrated. The structural rigid insert 504 included in the flange 500 of FIG. 11, is a mesh support member 504, formed or assembled into a square or rectangular shape. It should be appreciated that the mesh support member 504 is constructed with any suitable one of the materials discussed above that is available to be used as a structural rigid insert. In various embodiments, the mesh support member can be patterned or random, and can be constructed from a single molded material, or an assembly of multiple individual molded materials. In various embodiments, the mesh structural rigid insert 504 of FIGS. 11 and 12 is arranged in any suitable shape or pattern within the molded over silicone material 502 to provide suitable structural support and integrity to the flange 500. As seen in FIG. 12, the cross-sectional view taken along line XII-XII of FIG. 11 is illustrated. The structural rigid insert 504 has a relatively flat cross-sectional profile, depending upon the robustness of the construction of the mesh support member 504. It should be appreciated that in FIG. 12, the cross-sectional profile of the mesh support member 504 is exaggerated slightly for visual convenience, and can have a narrower thickness.

Referring now to FIGS. 13 and 14, a side view and cross-sectional view of one embodiment of a flange 600 of the present disclosure is illustrated. The structural rigid inserts 604a, 604b, 604c, 604d and 604e included in the flange 600 of FIG. 13, are a plurality square or rectangular tubes or rods arranged in columns within the silicone material 602. In the illustrated embodiment, the plurality of structural rigid inserts 604a to 604e are arranged vertically within the flange 600. It should also be appreciated that in various embodiments, the plurality of structural rigid inserts 604a to 604e can be arranged horizontally or on an angle with respect to the outline of the flange 700. In various embodiments, the plurality of structural rigid inserts 604a to 604e are parallel to one another. In other embodiments, the inserts are not parallel to one another. In various embodiments, the structural rigid inserts 604a to 604e of FIGS. 13 and 14 is arranged in any suitable shape or pattern within the molded over silicone material 602 to provide suitable structural support and integrity to the flange 600. As seen in FIG. 14, the cross-sectional view taken along line XIV-XIV of FIG. 13 is illustrated. Each of the structural rigid inserts 604a to 604e have a square or rectangular cross section. In various alternative embodiments, the structural rigid inserts are a hollow square or rectangular bars or assemblies with a hollow cross-sectional center rather than a solid cross section as illustrated in FIG. 14. In other embodiments, each of the structural rigid inserts 604a to 604e need not be the same size, shape and cross section as one another.

Figure 15:
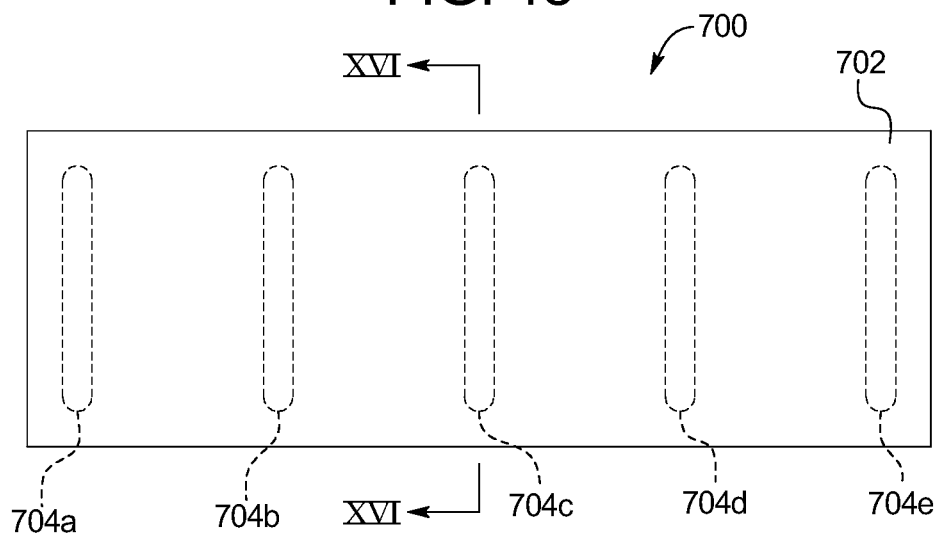
FIG. 15 is a side view of one example flange of an adjustable cookware device according to one example embodiment of the present invention.
Figure 16:
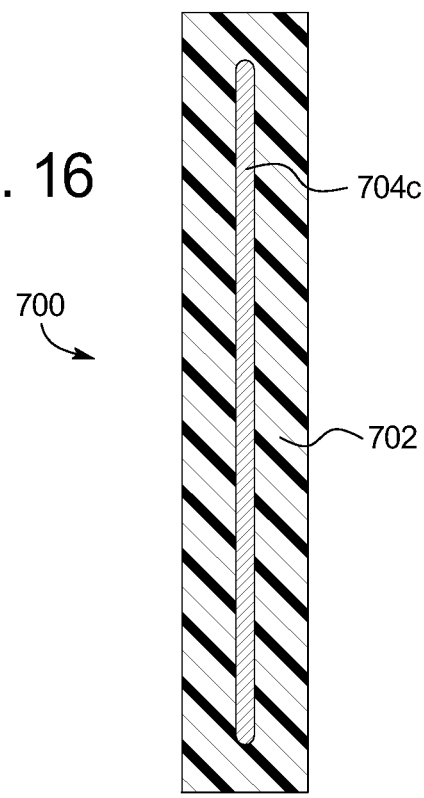
FIG. 16 is a cross-sectional view of the example flange depicted in FIG. 15 according to one example embodiment of the present invention.

Referring now to FIGS. 15 and 16, a side view and cross-sectional view of one embodiment of a flange 700 of the present disclosure is illustrated. The structural rigid inserts 704a, 704b, 704c, 704d and 704e included in the flange 700 of FIG. 15, are a plurality tubular or rounded rods arranged in columns within the silicone material 702. In the illustrated embodiment, the plurality of structural rigid inserts 704a to 704e are arranged vertically within the flange 700. It should also be appreciated that in various embodiments, the plurality of structural rigid inserts 704a to 704e can be arranged horizontally or on an angle with respect to the outline of the flange 700. In various embodiments, the plurality of structural rigid inserts 704a to 704e are parallel to one another. In other embodiments, the inserts are not parallel to one another. In various embodiments, the structural rigid inserts 704a to 704e of FIGS. 15 and 16 is arranged in any suitable shape or pattern within the molded over silicone material 702 to provide suitable structural support and integrity to the flange 700. As seen in FIG. 16, the cross-sectional view taken along line XVI-XVI of FIG. 15 is illustrated. Each of the structural rigid inserts 704a to 704e have a round or oblong cross section. In various alternative embodiments, the structural rigid inserts are a hollow round or oblong bars or assemblies with a hollow cross-sectional center rather than a solid cross section as illustrated in FIG. 16. In other embodiments, each of the structural rigid inserts 704a to 704e need not be the same size, shape and cross section as one another.

In various embodiments, the flanges are each removably coupled to the base plate of the adjustable cookware device. Due to the configuration of the molding of the flanges as well as the base plate, a user can snap the flanges into the base plate for a secure pivotable connection. Another user-friendly feature of the adjustable cookware device of the present disclosure is that the flanges, while securely fastened to the base plate during use or storage, can also be easily and repeatedly removed from the base plate for easy and thorough cleaning.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

We claim:

1. A multi-functional baking pan, comprising:
   a base plate;
   a plurality of first flanges pivotably connected to the base plate, the plurality of first flanges adjustable between at least a first flattened position and a second upright position, the first flanges being coplanar with the base plate when in the first flattened position and perpendicular or oblique to the base plate when in the second upright position; and
   a plurality of second flanges, each of the second flanges pivotably connected to the base plate, the plurality of second flanges adjustable between at least a third flattened position and a fourth upright position, the second flanges being coplanar with the base plate when in the third flattened position and perpendicular or oblique to the base plate when in the fourth upright position,
   wherein the flanges are positioned and arranged so that:
   (a) when the first flanges are in the first flattened position and the second flanges are in the third flattened position, each of the plurality of first flanges and each of the plurality of second flanges are arranged substantially flat with the base plate;
   (b) when the first flanges are in the second upright position and the second flanges are in the third flattened position, the plurality of first flanges are upright with respect to the base plate, the plurality of first flanges in the second upright position defining with the base plate a first baking zone which is open-topped with liquid tight sides and flat bottom, the first baking zone enclosed laterally on all sides by the first flanges when the first flanges are in the second upright position, the second flanges in the third flattened position forming at least part of the flat bottom of the first baking zone; and
   (c) when the second flanges are in the fourth upright position and the first flanges are in the first flattened position, the plurality of second flanges are upright with respect to the base plate, the plurality of second flanges in the fourth upright position defining with the base plate a second baking zone which is open-topped with liquid tight sides and flat bottom, the second baking zone having different dimensions than the first baking zone, the second baking zone enclosed laterally on all sides by the second flanges when the second flanges are in the fourth upright position.

2. The multi-functional baking pan of claim 1, wherein the each of the plurality of first flanges have a first height in the second upright position and each of the plurality of second flanges have a second height in the fourth position, the second height being different from the first height.

3. The multi-functional baking pan of claim 2, wherein the first baking zone has a depth substantially equal to the first height, and the second baking zone has a depth substantially equal to the second height.

4. The multi-functional baking pan of claim 1, wherein the base plate is rectangular.

5. The multi-functional baking pan of claim 1, wherein the first flanges and the second flanges are constructed at least from a silicone material.

6. The multi-functional baking pan of claim 5, wherein the silicone material is capable of withstanding heat of up to 550 degrees Fahrenheit.

7. The multi-functional baking pan of claim 5, wherein the first flanges and the second flanges each include at least a rigid support member.

8. The multi-functional baking pan of claim 7, wherein the rigid support member is metal.

9. The multi-functional baking pan of claim 1, wherein a top surface of the second flanges when the second flanges are in the third flattened position is co-planar with a top surface of the base plate.

10. The multi-functional baking pan of claim 9, wherein the base plate includes cutouts configured to receive the second flanges when the second flanges are in the third flattened position.

11. The multi-functional baking pan of claim 9, wherein a top surface of the first flanges when the first flanges are in the first flattened position is co-planar with a top surface of the base plate.

12. The multifunctional baking pan of claim 1, wherein, when the first flanges are in the first flattened position, and the second flanges are in the third flattened position, the multi-functional baking pan forms a cookie sheet having a baking surface which includes portions of the first flanges, the second flanges, and the base plate.

13. A multi-functional baking pan, comprising:
    a base plate;
    a plurality of first flanges removably and pivotably connected to the base plate, the first flanges having a first flattened position and a second upright position, the first flanges being coplanar with the base plate when in the first flattened position and perpendicular or oblique to the base plate when in the second upright position; and
    a plurality of second flanges removably and pivotably connected to the base plate, the second flanges having a third flattened position and a fourth flattened position, the second flanges being coplanar with the base plate when in the third flattened position, and perpendicular or oblique to the base plate when in the fourth upright position wherein the flanges are positioned and arranged so that:
    (a) a first baking zone which is open-topped with liquid tight sides and flat bottom is defined when the first flanges are pivoted to a second upright position and the second flanges are in the third flattened position, the first baking zone enclosed laterally on all sides by the first flanges when the first flanges are in the second upright position, the second flanges in the third flattened position forming at least part of the flat bottom of the first baking zone; and
    (b) a second baking zone which is open-topped with liquid tight sides and flat bottom is defined when the second flanges are pivoted to the fourth upright position, the second baking zone enclosed laterally on all sides by the second flanges when the second flanges are in the fourth upright position.

14. The multi-functional baking pan of claim 13, wherein the base plate, the plurality of first flanges and the plurality of second flanges are constructed with at least a silicone material.

15. The multi-functional baking pan of claim 14, wherein the plurality of first flanges are configured to be secured at least partially to one another when pivoted to the second upright position.

16. The multi-functional baking pan of claim 15, wherein the plurality of first flanges are secured to one another by at least engaging a male member associated with one of the plurality of first flanges with a female member associated with an adjacent one of the plurality of first flanges.

17. The multi-functional baking pan of claim 13, wherein the plurality of second flanges are configured to be secured at least partially to one another when pivoted to the fourth upright position.

18. The multi-functional baking pan of claim 17, wherein the plurality of second flanges are secured to one another by at least engaging a male member associated with one of the plurality of second flanges with a female member associated with an adjacent one of the plurality of second flanges.

19. The multi-functional baking pan of claim 13, wherein a top surface of the second flanges when the second flanges are in the third flattened position is co-planar with a top surface of the base plate.

20. The multi-functional baking pan of claim 13, wherein the base plate includes cutouts configured to receive the second flanges when the second flanges are in the third flattened position.

21. The multi-functional baking pan of claim 19, wherein a top surface of the first flanges when the first flanges are in the first flattened position is co-planar with a top surface of the base plate.

22. The multifunctional baking pan of claim 13, wherein, when the first flanges are in the first flattened position, and the second flanges are in the third flattened position, the multi-functional baking pan forms a cookie sheet having a baking surface which includes portions of the first flanges, the second flanges, and the base plate.

* * * * *